United States Patent
Sturm et al.

(10) Patent No.: US 10,732,263 B2
(45) Date of Patent: Aug. 4, 2020

(54) METHOD FOR CLASSIFYING A LONGITUDINALLY EXTENDED STATIONARY OBJECT IN A LATERAL SURROUNDING AREA OF A MOTOR VEHICLE, DRIVER ASSISTANCE SYSTEM AND MOTOR VEHICLE

(71) Applicant: VALEO Schalter und Sensoren GmbH, Bietigheim-Bissingen (DE)

(72) Inventors: Christian Sturm, Bietigheim-Bissingen (DE); Urs Luebbert, Bietigheim-Bissingen (DE); Stefan Goerner, Bietigheim-Bissingen (DE)

(73) Assignee: Valeo Schalter und Sensoren GmbH, Bietgheim-Bissingen (DE)

( * ) Notice: Subject to any disclaimer, the term of this patent is extended or adjusted under 35 U.S.C. 154(b) by 142 days.

(21) Appl. No.: 15/578,904

(22) PCT Filed: Jun. 2, 2016

(86) PCT No.: PCT/EP2016/062438
§ 371 (c)(1),
(2) Date: Dec. 1, 2017

(87) PCT Pub. No.: WO2016/193333
PCT Pub. Date: Dec. 8, 2016

(65) Prior Publication Data
US 2018/0172802 A1  Jun. 21, 2018

(30) Foreign Application Priority Data

Jun. 3, 2015  (DE) .................. 10 2015 108 759

(51) Int. Cl.
  *G01S 7/41*   (2006.01)
  *G01S 13/931*  (2020.01)
  (Continued)

(52) U.S. Cl.
  CPC ............. *G01S 7/415* (2013.01); *B60W 30/12* (2013.01); *G01S 7/411* (2013.01); *G01S 13/931* (2013.01);
  (Continued)

(58) Field of Classification Search
  CPC ........ G01S 7/415; G01S 7/411; G01S 13/931; B60W 30/12; G08G 1/167; G08G 1/165
  (Continued)

(56) References Cited

U.S. PATENT DOCUMENTS 8,760,663 B2 * 6/2014 Tearney ............. G02B 23/2476
                                                    356/479
2004/0189451 A1  9/2004 Zoratti
(Continued)

FOREIGN PATENT DOCUMENTS

DE   10 2004 016 025 A1   10/2004
DE   10 2004 016024 A1    10/2004
(Continued)

OTHER PUBLICATIONS

International Search Report issued in PCT/EP2016/062438 dated Sep. 15, 2016 (3 pages).
(Continued)

*Primary Examiner* — Bo Fan
(74) *Attorney, Agent, or Firm* — Osha Liang LLP

(57) ABSTRACT

The invention relates to a method for classifying an object (6) in a lateral surrounding area (5) of a motor vehicle (1), in which a signal is transmitted into the lateral surrounding area (5) by a sensor device (3) on-board the vehicle for monitoring the lateral surrounding area (5) and the signal reflected at the object (6) is received by said sensor device (3), wherein a monitoring area (E) of the sensor device (3) for monitoring the lateral surrounding area (5) is segmented into a first detection area (E1) and a second detection area
(Continued)

Figure 1:
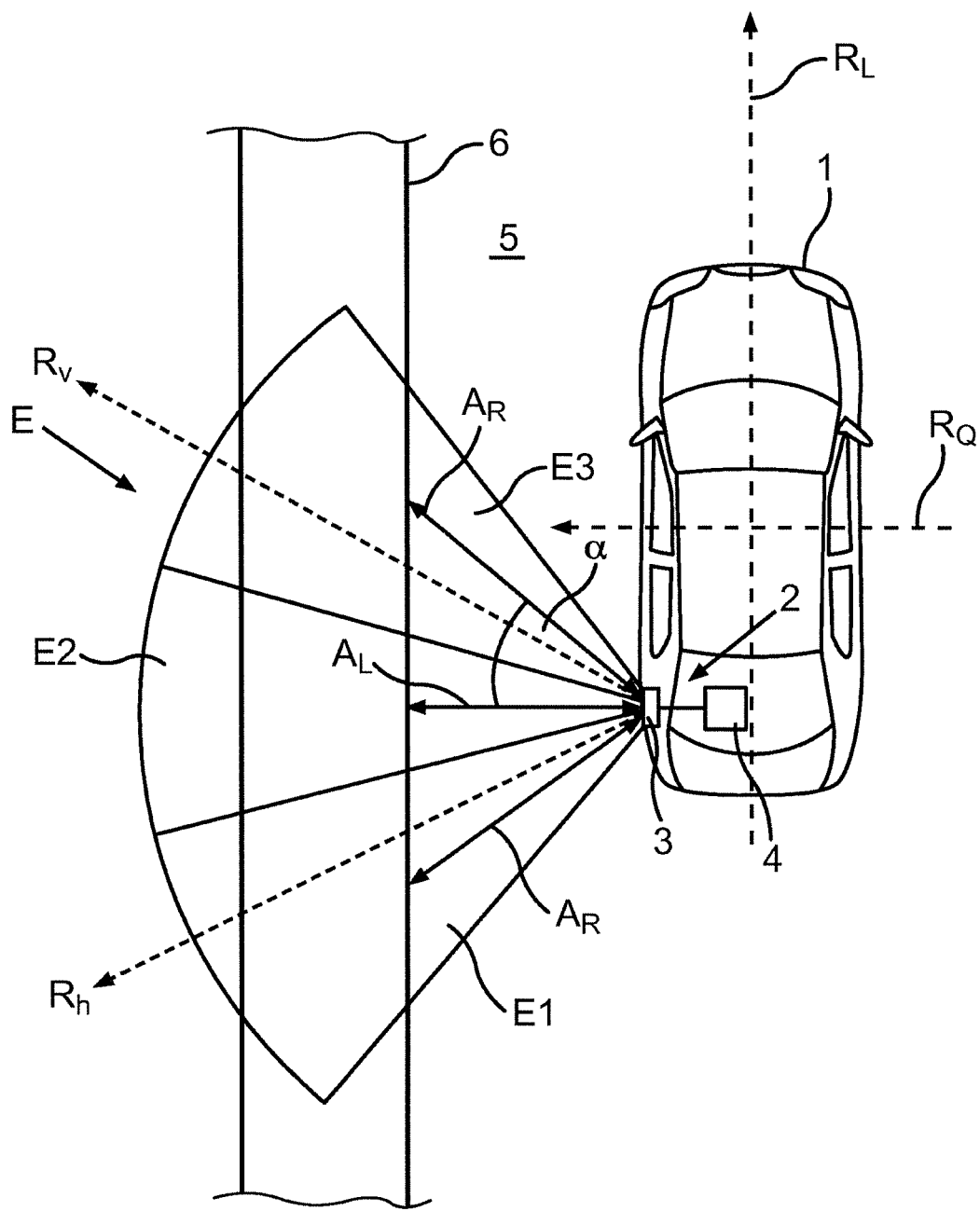

(E2), wherein a first value for a distance ($A_L$) from the object (6) to the motor vehicle (1) is defined on the basis of the signal received from the first detection area (E1) and it is determined whether the object (6) is a stationary object located laterally in relation to the motor vehicle (1), a second value for the distance ($A_L$) from the object (6) to the motor vehicle (1) is determined on the basis of the signal received from the second detection area (E2) and it is defined on the basis of the first value and the second value for the distance ($A_L$) whether the object (6) defined as a stationary object is a stationary object longitudinally extended in a longitudinal direction ($R_L$) of the vehicle. The invention furthermore relates to a driver assistance system (2) and a motor vehicle (1).

13 Claims, 2 Drawing Sheets

(51) Int. Cl.
　　　*G08G 1/16*　　　(2006.01)
　　　*B60W 30/12*　　(2020.01)
　　　*G01S 13/44*　　 (2006.01)
(52) U.S. Cl.
　　　CPC ............. *G08G 1/165* (2013.01); *G08G 1/167* (2013.01); *G01S 13/44* (2013.01); *G01S 2013/9315* (2020.01); *G01S 2013/93274* (2020.01)
(58) Field of Classification Search
　　　USPC .................. 342/105, 114, 175; 343/776, 713
　　　See application file for complete search history.

(56) References Cited

U.S. PATENT DOCUMENTS

| | | | |
|---|---|---|---|
| 2015/0156888 A1* | 6/2015 | Kawai | C25D 7/00 205/125 |
| 2015/0185319 A1 | 7/2015 | Matsuura et al. | |

FOREIGN PATENT DOCUMENTS

| | | |
|---|---|---|
| DE | 102004019651 A1 | 11/2005 |
| DE | 102005039895 A1 | 3/2007 |
| DE | 10 2005 039 859 B3 | 4/2007 |
| DE | 10 2006 018585 A1 | 10/2007 |
| DE | 10 2009 040003 A1 | 3/2011 |
| DE | 10 2012 206 790 A1 | 10/2013 |
| JP | H08-324366 A | 12/1996 |
| JP | 2005-145196 A | 6/2005 |
| JP | 2007-533991 A | 11/2007 |
| JP | 2014-029324 A | 2/2014 |

OTHER PUBLICATIONS

Written Opinion of the International Searching Authority issued in PCT/EP2016/062438 dated Sep. 15, 2016 (8 pages).
German Search Report issued in DE 10 2015 108 759.6 dated Mar. 3, 2016 (8 pages).
Notice of Preliminary Rejection in corresponding Korean Application No. 2017-7034763, dated Feb. 27, 2019 (13 pages).
Notification of Reason for Rejection in corresponding Japanese Application No. 2017-562627, dated Feb. 5, 2019 (10 pages).

* cited by examiner

METHOD FOR CLASSIFYING A LONGITUDINALLY EXTENDED STATIONARY OBJECT IN A LATERAL SURROUNDING AREA OF A MOTOR VEHICLE, DRIVER ASSISTANCE SYSTEM AND MOTOR VEHICLE

The invention relates to a method for classifying an object in a lateral surrounding area of a motor vehicle, in which a signal is transmitted into the lateral surrounding area by a sensor device on-board the vehicle for monitoring the lateral surrounding area and the signal reflected at the object is received by said sensor device. The invention furthermore relates to a driver assistance system and a motor vehicle.

It is already known from the prior art to detect objects in a surrounding area of a motor vehicle by means of a sensor device and to provide information relating to the object to a driver assistance system, for example a blind spot assistant or a lane change assistant. A distance from the object to the motor vehicle, for example, can be transmitted to the driver assistance system as one of the information elements. A warning signal, for example, can thus be output to a driver of the motor vehicle if it has been detected by the sensor device that the object is located in a blind spot of the motor vehicle and therefore, for example, a change of lane is not currently possible. Conversely, however, the transmission of a warning signal should be prevented in the case of vehicles which are moving on an adjacent carriageway separated by a crash barrier.

For this purpose, it is important for the driver assistance system to know what type of object the detected object is. The detected object must therefore be classified, for example to prevent the driver from being warned unnecessarily. It should therefore be possible, for example, to make a distinction between carriageway boundaries which extend in the form of crash barriers along a carriageway on which the motor vehicle is travelling and overtaking motor vehicles. It is thus possible, for example, to prevent the driver from being continuously and unnecessarily warned about a crash barrier while driving alongside it.

A lane-keeping function, for example, in which a central crash barrier is scanned by a plurality of sensor systems is described in DE 10 2005 039 859 A1. An object location of a 3D object at one side of transport vehicle is also classified in DE 10 2004 016 025 A1.

The object of the present invention is to be able to classify objects in a lateral surrounding area of a motor vehicle simply and with a high precision.

This object is achieved according to the invention by a method, a driver assistance system and a motor vehicle with the features according to the independent patent claims.

A method according to the invention serves to classify an object in a lateral surrounding area of a motor vehicle. In the method, a signal is transmitted into the lateral surrounding area by a sensor device on-board the vehicle for monitoring the lateral surrounding area and the signal reflected at the object is received by said sensor device. In addition, a monitoring area of the sensor device for monitoring the lateral surrounding area is segmented or divided into a first detection area and a second detection area. A first value for a distance from the object and the motor vehicle is defined on the basis of the signal received from the first detection area and it is determined whether the object is a stationary object located laterally in relation to the motor vehicle, a second value for the distance from the object to the motor vehicle is defined on the basis of the signal received from the second detection area and it is defined on the basis of the first value and the second value for the distance whether the object defined as a stationary object is a stationary object longitudinally extended in a longitudinal direction of the vehicle.

The lateral surrounding area of the motor vehicle or the lateral area of the motor vehicle is monitored by a sensor device with a sensor-specific monitoring area or a total detection area. The sensor device is preferably designed as a radar sensor which transmits electromagnetic waves as the signal into the lateral surrounding area and receives the electromagnetic waves reflected at the object. The lateral surrounding area is monitored in particular by means of one sensor device only or one radar sensor only.

The monitoring area or total detection area of the sensor device is then divided or segmented, for example by means of an evaluation device, into the two detection areas. For this purpose, the evaluation device can define two differently oriented angle ranges or angle segments in the total detection area as the two detection areas. The received signal components of the signal reflected by the object can be allocated to the respective detection area, depending on the angle from which the reflected signal component is reflected back onto the sensor device. Different information elements relating to specific detection areas can thus be obtained from the signal through separate evaluation of the signal components of the signal allocated to the individual detection areas. The object is classified by means of at least one signal component received from the first detection area, i.e. according to whether the object is stationary, i.e. whether the object is an infrastructure object. A distinction is therefore intended to be made on the basis of the signal components of the signal from the first detection area between moving objects, for example passing motor vehicles, and motionless or stationary objects. In addition, the first value for the distance is defined on the basis of the at least one signal component of the signal from the first detection area. In particular, the first value for the distance can be defined only if, or cannot be defined until, the object has been classified as a stationary object.

The second value for the spacing or distance from the object to the motor vehicle can be determined or defined by means of at least one signal component of the signal received from the second detection area. The detection areas are segmented or divided in such a way that the signal component in the respective detection area provides the optimum precision for receiving the required information. In other words, this means that the first detection area is selected in such a way that the infrastructure classification of the object is particularly reliably possible there, and the second detection area is selected in such a way that the distance measurement is particularly reliably and precisely possible there.

If the object has been detected as stationary on the basis of the signal component from the first detection area, the object can be classified as the object longitudinally extended in the longitudinal direction of the vehicle on the basis of a combination of the signal components from the first and the second detection area, i.e. on the basis of the first and the second value for the distance.

The longitudinally extended stationary object is preferably a carriageway boundary of a carriageway on which the motor vehicle is travelling elevated in a vertical direction of the vehicle which is oriented vertically in relation to the longitudinal direction of the vehicle and/or extending in a longitudinal direction of the vehicle at least over a length of the motor vehicle. An object of this type is, in particular, a crash barrier or an object similar to a crash barrier which is located, for example, along a carriageway edge or road edge in the lateral surrounding area of the motor vehicle. In particular, a distinction is intended to be made between longitudinally extended infrastructure objects of this type and other infrastructure objects, for example road signs.

A very reliable classification of the object in combination with a very precise distance measurement, in particular by means of one sensor device only or one signal only can thus be provided through the division of the monitoring area into the individual detection areas or sectors and the suitable combination of the measurements from the individual sectors. The method is therefore of particularly simple design.

The stationary object is preferably classified as the stationary object longitudinally extended in the longitudinal direction of the vehicle if a difference between the first value and the second value for the distance falls below a predefined threshold value. In particular, the stationary object is classified as the longitudinally extended infrastructure object if the first value and the second value for the distance are essentially equal or differ only slightly from one another. It can thus be ensured, for example, that the signal components from the first and the second detection area have been reflected at the same object due to the longitudinal extension of said object along the longitudinal direction of the vehicle. The method is therefore of particularly simple design.

The monitoring area of the sensor device is particularly preferably segmented into the first, the second and a third detection area and the first value for the distance is additionally defined on the basis of the signal received from the third detection area and it is determined whether the object is a stationary object. The result of the signal evaluation from the third detection area serves, in particular, to check the result of the signal evaluation from the first detection area. It can thus be particularly reliably and certainly defined whether the object detected in the lateral surrounding area is actually the longitudinally extended stationary object, i.e., for example, the crash barrier. The stationary object is classified as longitudinally extended, particularly on the basis of the first values from the first and the third detection area and on the basis of the second value from the second detection area.

A partial area in the lateral surrounding area which is oriented laterally in relation to the motor vehicle in a direction running obliquely backwards is preferably defined as the first detection area, a partial area in the lateral surrounding area which is oriented laterally in relation to the motor vehicle in a transverse direction of the vehicle oriented vertically in relation to the longitudinal direction of the vehicle is defined as the second detection area, and a partial area in the lateral surrounding area which is oriented laterally in relation to the motor vehicle in a direction running obliquely forwards is defined as the third detection area. In other words, the second detection area is defined as being located between the first and the third detection area. The detection areas can be defined in each case as adjoining one another or distanced from one another or overlapping in some areas.

The invention is therefore based on the realization that the signal components of the signal reflected at the object received from the obliquely aligned detection areas, i.e. from the first detection area and the third detection area, are particularly well-suited for the classification of the object in relation to its longitudinal speed. A highly precise distance measurement can be carried out in the second detection area into which the signal is transmitted from the sensor device, in particular vertically in relation to the longitudinal direction of the vehicle, into the lateral surrounding area and from which the signal is therefore also reflected vertically from the object back to the sensor device. The lateral distance, i.e. the distance from the motor vehicle to the object in the transverse direction of the vehicle can be determined, in particular, directly on the basis of the signal received from the second detection area. In the case of the motor vehicle travelling alongside the object, the lateral distance represents the shortest distance from the longitudinal axis of the vehicle to the object.

In the case of the sensor device designed, in particular, as a radar sensor, the direction from which the signal component has been received can be determined through the integrated angle detection of the signal components reflected at the object, and the signal component of the signal can thus be allocated to the corresponding detection area.

In one advantageous embodiment, the first detection area covers an angle range between 45 degrees and 80 degrees in relation to the longitudinal direction of the motor vehicle, the second detection area covers an angle range between 80 degrees and 100 degrees in relation to the longitudinal direction of the vehicle and the third detection area covers an angle range between 100 degrees and 135 degrees in relation to the longitudinal direction of the vehicle. The total detection area of the sensor device therefore extends here between at least 45 degrees and 135 degrees in relation to the longitudinal direction of the vehicle.

A radial speed of the object is particularly preferably detected on the basis of the signal received from the first detection area and/or from the third detection area and, if the detected radial speed corresponds to an expected value for the radial speed of a stationary object predefined for at least one angle within the respective detection area, the detected object is classified as such. The radial speed is the radial component of a relative speed of the object and the motor vehicle in relation to one another. The radial speed determined by the sensor device from the signal components of the first and/or the third detection area is compared with the expected value, for example a stored value, which would be expected, taking account of the vehicle speed and the angle from which the signal component has been received, possibly also taking account of a predefined tolerance, in the case of a stationary object which is located in the first and/or the third detection area. In the event of a correspondence, the detected object is classified and qualified as an infrastructure object.

Particularly in the case of reflected signals which, as in the case of the, in particular, obliquely oriented first and/or third detection area, are not reflected from a vertically oriented direction back to the sensor device, a longitudinal speed can be determined particularly reliably and precisely from the measured radial speed. The radial speed of the object is in fact substantially higher there than in the case of a signal reflected vertically back to the sensor device, as in the case of the second detection area oriented, in particular, in the transverse direction of the vehicle. The radial speed is in fact very low or virtually zero in the second detection area, as a result of which a definition of the longitudinal speed from the measured radial speed is affected there by a relatively high absolute error. It is therefore particularly advantageous to classify the object on the basis of the signal reflected from the first and/or from the third detection area.

The second value for the distance is preferably determined on the basis of a transit time of the transmitted signal and the signal received from the second detection area. A distance measurement can be carried out very precisely in this second detection area. The signal components of the signal from the second detection area are therefore used to detect the distance of the longitudinally extended structural object. In the case of the second detection area oriented, in particular, vertically in relation to the longitudinal direction of the vehicle, the distance can be simply and precisely determined on the basis of the transit time, i.e. the time between the transmission and reception of the signal, since no oblique visual angle in which the signal is transmitted and once more received needs to be taken into account. The lateral distance from the motor vehicle to the longitudinally extended object can therefore be determined directly from the transit time of the signal in the transverse direction of the vehicle. In addition, however, the angle from which the signal component has been received can also be taken into account within the second detection area. This is relevant, particularly in the case of signal components of the second detection area which have been received slightly obliquely, i.e. deviating slightly from the vertical direction.

It proves to be advantageous if the first value for the distance is determined on the basis of a transit time of the transmitted signal and the signal received from the first and/or a third detection area and on the basis of an angle of the received signal in relation to the transverse direction of the vehicle. A radial distance from the motor vehicle to the longitudinally extended object can be determined directly on the basis of the transit time of the transmitted signal and the signal received from the first and/or third detection area. The radial distance is a distance from the motor vehicle to the object in the obliquely oriented direction of movement of the signal component of the signal. This radial distance can be converted particularly simply into the lateral distance on the basis of the angle which is detected, for example by means of a monopulse method known per se. This first value for the distance defined on the basis of the signal components from the first and/or the third detection area is used for the comparison with the second value for the distance defined on the basis of the signal component allocated to the second detection area. It is possible to check, in particular, by means of the first values for the distance from the first and the third detection area, whether the second value for the distance determined from the second detection area actually represents the distance to the longitudinally extended object, or whether the second value for the distance from the second detection area, represents, for example, the distance to a different object, for example a passing different vehicle. The method is therefore particularly simple and reliable.

According to one embodiment of the method, at least one measuring cycle is performed to classify the object and, following the identification of the stationary object, the respective value for the distance is defined and stored for each of the detection areas, the stationary object is classified as being longitudinally extended in the longitudinal direction of the vehicle on the basis of the first and the second value for the distance, and a current valid value for the distance is defined on the basis of a predefined criterion. A measuring cycle comprises, in particular, the transmission of the signal and the reception of the signal reflected at the object. A measuring cycle may entail a plurality of detections of the object. A plurality of first and second values for the distance can thus be defined in one measuring cycle. The lateral distance can either be defined directly or can be calculated from the measured radial distances after each measuring cycle, for example by means of the transit time measurement.

The values defined for the lateral distance can be stored, for example, in buffer memories of a defined size, for example in each case eight values, wherein one buffer memory can be allocated in each case to each detection area and the value defined for the respective detection area can be written to the corresponding buffer memory. In addition, values from a plurality of measuring cycles or from a plurality of detections of the object of one measuring cycle for the lateral distance can be sorted within a buffer memory according to their size. The values can thus be evaluated particularly simply and the currently valid value for each measuring cycle can be quickly selected from the values on the basis of the predefined criterion. If the three values are roughly equal, this indicates the presence of an extended infrastructure object and, in particular, one of the second values allocated to the second detection area is selected on the basis of the predefined criterion as the currently valid value for the distance. The selection of the second smallest second value as the currently valid value, for example, can be defined as the criterion. Through this criterion, it can be ensured, in particular, that a one-off incorrect detection or incorrect classification does not result in an error in the distance determination.

One development of the invention provides that the currently valid value for the distance is updated following a performance of a further measuring cycle only if the second value for the distance determined from the second detection area is greater than the first value for the distance determined from the first and/or the third detection area and/or if the second value for the distance defined from the second detection area deviates from the currently valid value for the distance at most by a predefined threshold value.

The buffer memories in which the values for the distances are stored are not reset, in particular, at the start of a new measuring cycle, but instead still contain the values from the preceding measuring cycles. The respective oldest, still present value, for example, for each buffer memory can be overwritten. If the presence of the structural object has already been detected, the evaluation device can, for example, evaluate the values for the distance in the buffer memories. If the second value determined in the second detection area is, in particular, significantly greater than the first values determined in the first and/or the third detection area and, in particular, the first values in the first and in the third detection area are roughly equal, this may indicate outdated values in the buffer memories. The currently valid value for the distance is then updated and replaced with the second value for the distance from the second detection area determined in the further measuring cycle.

The value for the currently valid distance is also updated if the determined second value for the distance deviates at most by a predefined threshold value, for example 0.5 metres, from the currently valid value for the distance. If the determined second value for the distance deviates from the currently valid value for the distance by more than a predefined threshold value, the second value for the second detection area detected in the further measuring cycle may indicate, for example, that a different, overtaking vehicle has been detected on the basis of the signal received from the second detection area. However, in order to correctly indicate the distance of the longitudinally extended infrastructure object, the newly determined second value for the distance which characterizes the distance to the overtaking vehicle is not adopted, i.e. the currently valid value for the distance is not updated.

One design of the invention provides that a wildcard value or dummy value for the distance is specified in each case for each detection area, wherein the wildcard values are specified during an initialization of the sensor device and/or are specified after a predefined number of measuring cycles. The wildcard values may be used, for example, to initialize the sensor and may be indicated with a very long distance, for example 32 metres. In addition, the wildcard values can be written to the buffer memories at regular intervals, for example every four measuring cycles, in order to avoid an excessively long retention of old measured values in the buffer memories in the absence of new detections. These wildcard values may be detected, for example, by the evaluation device. If the evaluation device, when reading the buffer memories, establishes, for example, that only corresponding wildcard values are present, it is assumed that no longitudinally extended object is present.

The invention also relates to a driver assistance system for classifying an object in a lateral surrounding area of a motor vehicle. The driver assistance system has a sensor device on-board the vehicle for monitoring the lateral surrounding area by transmitting a signal into the lateral surrounding area and by receiving the signal reflected at the object. In addition, an evaluation device of the driver assistance system is designed to segment a monitoring area of the sensor device for monitoring the lateral surrounding area into a first detection area and a second detection area and to define a first value for a distance from the object to the motor vehicle on the basis of the signal received from the first detection area and to determine whether the object is a stationary object located laterally in relation to the motor vehicle, to determine a second value for the distance from the object to the motor vehicle on the basis of the signal received from the second detection area and to define, on the basis of the first value and the second value for the distance, whether the object defined as a stationary object is a stationary object longitudinally extended in a longitudinal direction of the vehicle on the basis of the signal received from the second detection area. The driver assistance system is designed, in particular, as a lane change assistant or a blind spot assistant.

A motor vehicle according to the invention comprises a driver assistance system according to the invention. The motor vehicle is designed, in particular, as a passenger vehicle.

The preferred embodiments and their advantages, presented with reference to the method according to the invention, apply accordingly to the driver assistance system according to the invention and to the motor vehicle according to the invention.

The descriptors "above", "below", "forwards", "backwards", "laterally", "on the left-hand side", "on the right-hand side", "obliquely backwards" ($R_h$), "obliquely forwards" ($R_v$), "vertical direction of the vehicle", "longitudinal direction of the vehicle" ($R_L$), "transverse direction of the vehicle" ($R_Q$), etc., are used to indicate positions and orientations in the case of an appropriate arrangement of the sensor device on the motor vehicle and an observer then looking at the motor vehicle and looking in the direction of the motor vehicle.

Further features of the invention can be found in the claims, the figures and the description of the figures. The features and feature combinations specified above in the description, and also the features and feature combinations shown below in the description of the figures and/or in the figures alone are usable not only in the respectively indicated combination, but also in other combinations or in isolation without departing the scope of the invention. Details of the invention which are not explicitly shown and explained in the figures, but which emerge and can be produced from the explained details through separated feature combinations are thus also to be regarded as included and disclosed. Details and feature combinations which do not therefore have all of the features of an originally formulated independent claim are also to be regarded as disclosed.

The invention will now be explained in detail below on the basis of a preferred example embodiment and with reference to the attached drawings.

Figure 2:
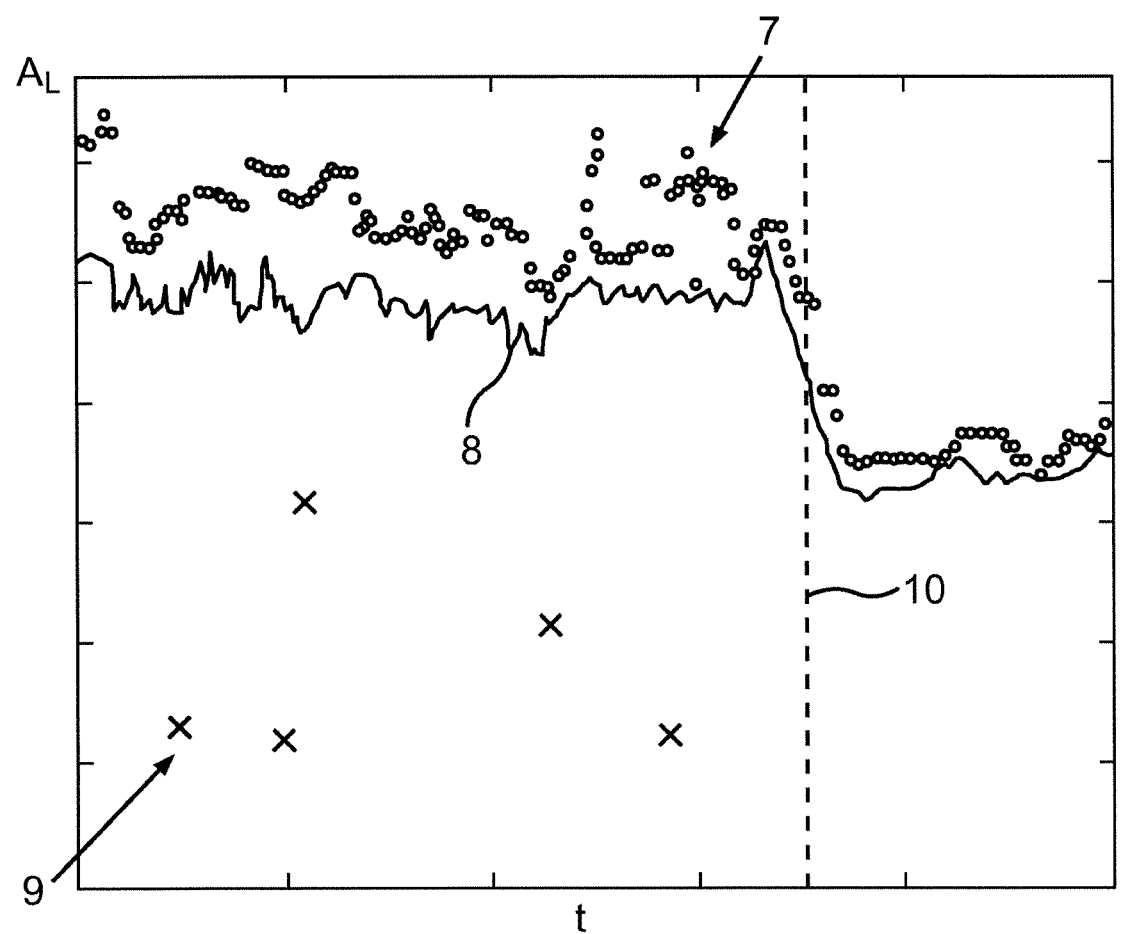

In the drawings:

FIG. 1 shows a schematic representation of an embodiment of a motor vehicle in a classification of a longitudinally extended stationary object; and FIG. 2 shows an example of a variation with time in distance measurements of the motor vehicle in relation to the longitudinally extended object from the individual detection areas.

Identical and functionally identical elements are denoted with the same reference numbers in the figures.

FIG. 1 shows a motor vehicle 1 with a driver assistance system 2. The driver assistance system 2 is designed, in particular, as a lane change assistant and/or a blind spot assistant and has a sensor device 3 and an evaluation device 4 which may be integrated into the sensor device 3. The driver assistance system 2 is designed to detect and classify objects in a lateral surrounding area 5 of the motor vehicle 1. Objects, inter alia, which are located in the lateral surrounding area 5 of the motor vehicle 1, are stationary and are longitudinally extended in a longitudinal direction $R_L$ of the vehicle are intended to be detected, classified and their distance $A_L$ to the motor vehicle 1 defined. A longitudinally extended stationary object 6 of this type is understood primarily to mean an object which is elevated in a vertical direction of the vehicle and/or extends in the longitudinal direction $R_L$ of the vehicle at least over a length of the motor vehicle 1 and represents a carriageway boundary of a carriageway on which the motor vehicle 1 is travelling, particularly in the form of a crash barrier.

In order to detect the longitudinally extended stationary object 6 of a longitudinally extended infrastructure object, the sensor device 3, which is preferably designed as a radar sensor, transmits a signal into the lateral surrounding area 5 of the motor vehicle 1 and receives the signal reflected at the object 6. The sensor device 3 is arranged here on an outer cladding part of the motor vehicle 1 in the rear area of the motor vehicle 1 and detects a lateral surrounding area 5 of the motor vehicle 1 here on the left-hand side (with a viewing direction in the direction of the longitudinal axis of the vehicle). The sensor device 3 may also be arranged so that a part of the rearward area of the motor vehicle 1 can additionally be detected. However, at least one further sensor device 3 (not shown here) can also be provided to detect a surrounding area, for example on the right-hand side (with a viewing direction in the direction of the longitudinal axis of the vehicle). The sensor device 3 has a monitoring area E or a total detection area within which it can detect the object 6 in the lateral surrounding area 5 of the motor vehicle 1.

The evaluation device 4 of the driver assistance system 2, which may be formed, for example, by a control unit on-board the vehicle, is now designed to segment or divide the monitoring area E of the sensor device 3, for example, into a first detection area E1, a second detection area E2 and a third detection area E3. For this purpose, the evaluation device 4 can define angle segments or angle ranges in the total detection area E as the detection areas E1, E2, E3. The detection area E1 is oriented here obliquely backwards in a direction $R_h$. The first detection area E1 may, for example, cover an angle range between 45 degrees and 80 degrees in relation to the longitudinal direction $R_L$ of the motor vehicle 1. The second detection area E2 is aligned here in a transverse direction $R_Q$ of the vehicle oriented vertically in relation to the longitudinal direction $R_L$ of the vehicle. The second detection area E2 can cover, for example, an angle range between 80 degrees and 100 degrees in relation to the longitudinal direction $R_L$ of the vehicle. The third detection area E3 is oriented here obliquely forwards in a direction $R_V$. The third detection area E3 can cover, for example, an angle range between 100 degrees and 135 degrees in relation to the longitudinal direction $R_L$ of the vehicle. The detection areas E1, E2, E3 are adjacent to one another here and, particularly in the projection plane shown in FIG. 1, are defined and shown as overlap-free.

However, the detection areas E1, E2, E3 may also be defined as slightly distanced from one another and do not necessarily have to cover the total detection area E of the sensor device 3. This means that narrow angle segments which are not evaluated may be located between the detection areas E1, E2, E3, wherein the angle segments located between the detection areas E1, E2, E3 have, in particular, a narrower angular diameter than the detection areas E1, E2, E3 themselves. However, the detection areas E1, E2, E3 may also overlap one another in some areas, particularly in peripheral areas of the detection areas E1, E2, E3.

In the case of the longitudinally extended stationary object 6, the signal is returned or reflected from different angles back to the sensor device 3. The sensor device 3 can allocate the signal component of the reflected signal to the respective detection areas E1, E2, E3 on the basis of an angle α from which the signal component arrives at the sensor device 3. All detections which potentially correspond to a reflection by an infrastructure object are taken into account in the first detection area E1 and/or in the third detection area E3. In other words, the evaluation device 4 evaluates the signal components of the signal from the first detection area E1 and/or the third detection area E3 in order to detect the object as stationary or motionless. For this purpose, a radial speed of the stationary object 6 is measured in the first detection area E1 and/or the third detection area E3 and a longitudinal speed is determined therefrom, since the radial speed differs significantly from zero there. The object 6 can be identified as an infrastructure object by comparing the measured radial speed with the radial speed expected for the corresponding target angle at the instantaneous vehicle speed for an infrastructure object, i.e. with an expected value for the radial speed. If the two radial speeds, i.e. the detected and the expected radial speed, match one another, particularly taking account of the angle α and a specified tolerance threshold, the corresponding detection is classified as an infrastructure object, i.e. as a stationary object, and is therefore qualified for further evaluations.

In addition, a first value for the lateral distance $A_L$ from the object 6 to the motor vehicle 1 is defined in each case on the basis of the signal components of the first detection area E1 and/or the third detection area E3. For this purpose, a radial distance $A_R$ from the motor vehicle 1 to the stationary object 6 can first be defined by means of a transit time measurement. The lateral distance $A_L$ can be calculated from the radial distance $A_R$, taking account of the angle α of the signal component in relation to the transverse direction $R_Q$ of the vehicle.

However, a lateral distance $A_L$ to the motor vehicle 1 can be determined very precisely in the second detection area E2 in which the radial speed measurement is close to zero and does not therefore enable a reliable infrastructure classification. A second value for the lateral distance $A_L$ is determined or defined from the transit time of the signal transmitted in the transverse direction $R_Q$ of the vehicle and the signal reflected at the longitudinally extended stationary object 6. In the case of the motor vehicle 1 travelling alongside the longitudinally extended stationary object 6, i.e. the crash barrier, the lateral distance $A_L$ represents the shortest distance from the motor vehicle 1 to the longitudinally extended object 6. The stationary object can be defined as the stationary object 6 longitudinally extended along the longitudinal direction $R_L$ of the vehicle on the basis of the first and the second value for the distance $A_L$. The stationary object is defined as longitudinally extended, particularly if the first value for the distance $A_L$ from the first and/or the third detection area E1, E3 and the second value for the distance $A_L$ from the second detection area E2 are essentially equal, i.e. a difference between the first and the second value falls below a specified threshold value.

In particular, a plurality of measuring cycles can be performed to classify the object 6. For this purpose, the respective value of the lateral distance $A_L$ is defined in each measuring cycle for each detection area E1, E2, E3. For this purpose, a buffer memory of a specified size, for example eight values, is created in each case during an initialization of the sensor device 3 for each of the detection areas E1, E2, E3 and can be initialized with a wildcard value or a dummy value for the lateral distance $A_L$. The wildcard value may have a very high value for the lateral distance $A_L$, for example 32 metres. In each measuring cycle, the measured radial distance $A_R$ is converted into the lateral distance $A_L$, taking account of the angle α, for each detection area E1, E2, E3 and for each qualified detection, i.e. if the object is classified as an infrastructure object, and is written to the associated buffer memory.

The buffer memories are not reset at the start of a new measuring cycle, but instead still contain the values from the preceding measuring cycles. The oldest, still present value, for example, can be replaced in each buffer memory. An evaluation of the values is performed for each measuring cycle on completion of a detection routine. For this purpose, the values can be sorted, for example according to their size, in each buffer and a value based on a predefined criterion or a value at a defined position in the sorting, for example the second smallest value, can be output and can be specified as the currently valid value for the distance $A_L$. By means of the criterion, i.e., for example, by means of the output of the second smallest value, it can be ensured that a one-off incorrect detection or incorrect classification does not result in an error in the detection of the object 6, i.e. in the crash barrier detection. The wildcard values with the very high distance value can be written to the buffer memories at regular intervals, for example every four measuring cycles, in order to avoid an excessively long retention of old measured values in the buffer memories in the absence of new detections.

The lateral distance $A_L$ to the laterally nearest object can thus be determined in each measuring cycle for each detection area E1, E2, E3. In the first and third detection areas E1, E3, it can be assumed that the classification of the object 6 as a stationary object has been carried out very reliably due to the precise speed measurement or radial speed measurement, and the distance determined in these detection areas E1, E3 or the determined first value for the distance $A_L$ thus represents the nearest stationary object 6. Conversely, certain restrictions in the precision of the measured distance $A_R$ and the lateral distance $A_L$ calculated therefrom can be expected due to the oblique visual angle. On the other hand, it cannot be ensured that the lateral distance $A_L$ determined from the second detection area E2 actually represents a stationary object. The determined distance $A_L$ from the second detection area E2, for example, could also belong to a moving object, for example to an overtaking vehicle. However, it can be assumed in the second detection area E2 that the distance measurement is very precise. The values determined from the three detection areas E1, E2, E3 can therefore be suitably combined or evaluated by the evaluation device 4 in order to decide whether a longitudinally extended stationary object 6 is present, and, if necessary, define its distance $A_L$ precisely.

If, for example, very similar distance values $A_L$, for example for the first detection area E1 and the second detection area E2 occur over a specific number of measuring cycles, the presence of the longitudinally extended stationary object 6 can be assumed. The second value measured from the second detection area E2 can be defined as the lateral distance $A_L$.

If the presence of the longitudinally extended object 6 has already been detected and the second value for the distance $A_L$ determined in the second detection area E2 differs at most by a predefined threshold value, for example 0.5 metres, from the values for the distance $A_L$ determined from the preceding measuring cycles, the currently valid value for the distance $A_L$ of the object 6 is updated with the determined second value for the distance $A_L$ from the second detection area E2. However, if the second value for the distance $A_L$ determined from the second detection area E2 differs by more than the specified threshold value from the value for the distance $A_L$ from the preceding measuring cycle, the existing currently valid distance $A_L$ of the longitudinally extended object 6 is retained. This case occurs, for example with overtaking motor vehicles which overtake the motor vehicle 1 in a space between the motor vehicle 1 and the crash barrier 6.

If the presence of the longitudinally extended stationary object 6 has already been detected and the second value for the distance $A_L$ determined in the second detection area E2 is, in particular, significantly greater than the first values for the distance $A_L$ from the first and the third detection area E1, E3 and these two first values for the distance $A_L$ are additionally similar, the currently valid distance $A_L$ of the object 6 is updated with the current second value for the distance $A_L$ from the second detection area E2. This case occurs, for example, with outdated values in the buffer memories.

However, if there is no correspondence between the values for the distance $A_L$ from at least two of the three detection areas E1, E2, E3 or only corresponding wildcard values are present in the buffer memories, it is assumed that no longitudinally extended object 6 is present in the lateral surrounding area 5.

FIG. 2 shows an example of a measurement or detection of the distance $A_L$ (x-axis) from the motor vehicle 1 to the object 6 over time t (y-axis) in the individual detection areas E1, E2, E3. The selective measured values 7 indicated by means of circles are first values for the distance $A_L$ from the first and the third detection area E1, E3. The continuously drawn line 8 shows the overall result of a definition of the distance $A_L$ from the values of all detection areas E1, E2, E3. The variation with time illustrated by way of example in FIG. 2 therefore shows that the second values from the second detection area E2 produce very precise results for the distance measurement. The measured values 9, marked with an x, are similarly measured values from the second detection area and represent overtaking motor vehicles. The second value for the distance $A_L$, not to the object 6, but instead to other objects, for example the overtaking motor vehicles, has therefore been detected at the positions of the measured values 9 on the basis of the measured values from the second detection area E2. However, the object 6 is reliably detected on the basis of the first values detected from the first and the third detection area E1, E3 and the currently valid distance $A_L$ is therefore not set to the second value of the second detection area E2 which shows the overtaking vehicle. The distance $A_L$ from the motor vehicle 1 to the object 6 decreasing from the line 10 is based on a lane change by the motor vehicle 1, as a result of which the motor vehicle 1 moves closer to the object 6.

A method for detecting and classifying extended infrastructure objects 6, in particular at the road edge, by means of the sensor device 3, in particular a radar sensor, is thus shown by the invention.

The invention claimed is:

1. A method for classifying an object in a lateral surrounding area of a motor vehicle, the method comprising:
   transmitting a signal into the lateral surrounding area by a sensor device on-board the vehicle for monitoring the lateral surrounding area;
   receiving the signal reflected at the object by said sensor device;
   segmenting a monitoring area of the sensor device for monitoring the lateral surrounding area into a first detection area and a second detection area,
   wherein a first value for a distance from the object to the motor vehicle is defined based on the signal received from the first detection area;
   determining whether the object is a stationary object located laterally in relation to the motor vehicle;
   determining a second value for the distance from the object to the motor vehicle is determined on the basis of the signal received from the second detection area; and
   determining, on the basis of the first value and the second value for the distance, whether the object defined as the stationary object is a stationary object longitudinally extended in a longitudinal direction of the vehicle,
   wherein received signal components of the signal reflected at the object are allocated to the first detection area or the second detection area based on an angle at which the received signal components are reflected back onto the sensor device.

2. The method according to claim 1, further comprising classifying the stationary object longitudinally extended in the longitudinal direction of the vehicle when a difference between the first value and the second value for the distance falls below a specified threshold value.

3. The method according to claim 1, further comprising:
   segmenting the monitoring area of the sensor device into a third detection area; wherein the first value for the distance is additionally defined on the basis of the signal received from the third detection area; and
   determining whether the object is the stationary object.

4. The method according to claim 3, wherein:
   a partial area in the lateral surrounding area which is oriented laterally in relation to the motor vehicle in a direction running obliquely backwards is defined as the first detection area,
   a partial area in the lateral surrounding area which is oriented laterally in relation to the motor vehicle in a transverse direction of the vehicle oriented vertically in relation to the longitudinal direction of the vehicle is defined as the second detection area, and a partial area in the lateral surrounding area which is oriented laterally in relation to the motor vehicle in a direction running obliquely forwards is defined as the third detection area.

5. The method according to claim 3, wherein the first detection area covers an angle range between 45 degrees and 80 degrees in relation to the longitudinal direction of the motor vehicle the second detection area covers an angle range between 80 degrees and 100 degrees in relation to the longitudinal direction of the vehicle and the third detection area covers an angle range between 100 degrees and 135 degrees in relation to the longitudinal direction of the vehicle.

6. The method according to claim 1, wherein a radial speed of the object is detected on the basis of the signal received from the first detection area and/or from a third detection area and, if the detected radial speed corresponds to an expected value for the radial speed of a stationary object predefined for at least one angle within a respective detection area, the detected object is identified as such.

7. The method according to claim 1, wherein the second value for the distance is determined on the basis of a transit time of the transmitted signal and the signal received from the second detection area.

8. The method according to claim 1, wherein the first value for the distance is determined on the basis of a transit time of the transmitted signal and the signal received from the first and/or a third detection area and on the basis of an angle of the received signal in relation to a transverse direction of the vehicle.

9. The method according to claim 1, wherein at least one measuring cycle is performed to classify the object and, following an identification of the stationary object, a respective value for the distance is defined and stored for each of the detection areas, the stationary object is classified as longitudinally extended in the longitudinal direction of the vehicle on the basis of the first and the second value for the distance, and a current valid value for the distance is defined on the basis of a predefined criterion.

10. The method according to claim 9, wherein the currently valid value for the distance is updated following the performance of a further measuring cycle only if the second value for the distance determined from the second detection area is greater than the first value for the distance determined from the first and/or a third detection area and/or if the second value for the distance defined from the second detection area deviates from the currently valid value for the distance at most by a predefined threshold value.

11. The method according to claim 9, wherein a wildcard value for the distance is specified in each case for each detection area, wherein the wildcard values are specified during an initialization of the sensor device and/or are specified after a predefined number of measuring cycles.

12. The method according to claim 1, the sensor device is a radar sensor.

13. The method according to claim 1, wherein a carriageway boundary of a carriageway on which the motor vehicle is travelling, elevated in a vertical direction of the vehicle and/or extending in a longitudinal direction of the vehicle at least over a length of the motor vehicle is detected as the extended stationary object.

* * * * *